United States Patent [19]
Breuer et al.

[11] 3,887,573
[45] June 3, 1975

[54] 5-MERCAPTOALKYL-1,2,4-OXADIAZOLE DERIVATIVES

[75] Inventors: Hermann Breuer; Uwe D. Treuner, both of Regensburg, Germany

[73] Assignee: E. R. Squibb & Sons, Inc., Princeton, N.J.

[22] Filed: Jan. 5, 1973

[21] Appl. No.: 321,419

[52] U.S. Cl...... 260/307 G; 260/240 D; 260/240 K; 260/240 R; 260/243 B; 260/247.1; 260/247.2 B; 260/268 R; 260/268 H; 260/293.67; 260/293.85; 260/326.83; 260/564 R; 424/246; 424/248; 424/250; 424/267; 424/272
[51] Int. Cl............................................ C07d 85/52
[58] Field of Search....... 260/307 G, 293.67, 268 H, 260/247.1 M, 240 K, 240 D, 240 R, 243 B

[56] References Cited
OTHER PUBLICATIONS
Smith – "Open Chain Nitrogen Compounds" – Vol. 1, (1965), W. A. Benjamin, Inc., New York, pp. 276–7.

*Primary Examiner*—Donald G. Daus
*Assistant Examiner*—Raymond V. Rush
*Attorney, Agent, or Firm*—Lawrence S. Levinson; Merle J. Smith

[57] ABSTRACT

5-Mercaptoalkyl-1,2,4-oxadiazole derivatives of the general formula

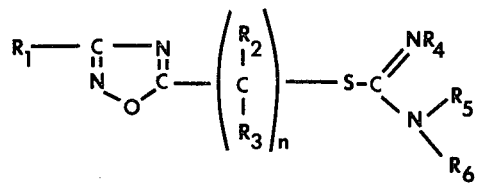

and salts thereof, are useful as anti-inflammatory agents.

9 Claims, No Drawings

5-MERCAPTOALKYL-1,2,4-OXADIAZOLE DERIVATIVES

SUMMARY OF THE INVENTION

This invention relates to new 5-mercaptoalkyl-1,2,4-oxadiazole derivatives of the formula (I) 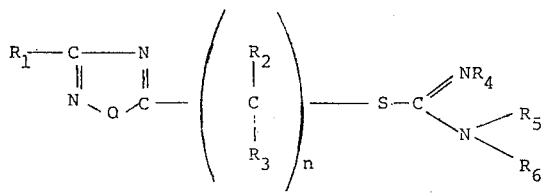

wherein $R_1$ is lower alkyl, lower alkenyl, cyclo-lower alkyl, phenyl, substituted phenyl, phenyl-lower alkyl, substituted phenyl-lower alkyl or phenyl-lower alkenyl; $R_2$, $R_3$, $R_4$, $R_5$ and $R_6$, which may be the same or different, are hydrogen or lower alkyl; the radical

also is one of the heterocyclics piperidino, morpholino, thiamorpholino, piperazino or pyrrolidino; and $n$ is 1, 2 or 3.

The preferred compounds of this class are those wherein $R_1$ is lower alkyl, especially methyl, phenyl or phenyl-lower alkyl, $R_2$ and $R_3$ are hydrogen or lower alkyl, especially hydrogen, $R_4$, $R_5$ and $R_6$ are hydrogen or lower alkyl, especially methyl, and $n$ is 1 or 2, especially 1.

DETAILED DESCRIPTION OF THE INVENTION

The lower alkyl groups represented by the various symbols are straight or branched chain saturated hydrocarbon radicals of one to seven carbon atoms, preferably one to three carbon atoms, such as methyl, ethyl, propyl, isopropyl, butyl, t-butyl and the like. The lower alkenyl groups are mono-unsaturated hydrocarbon radicals of the same kind. The cyclolower alkyl groups are the three to six carbon alicyclics cyclopropyl, cyclobutyl, cyclopentyl and cyclohexyl, the last two being preferred.

The substituted phenyl radicals are monosubstituted phenyl groups, i.e., $R_7$-phenyl wherein $R_7$ is lower alkyl, halo (preferably chloro or bromo) or lower alkoxy (preferably methoxy), especially in the para-position.

The phenyl-lower alkyl and phenyl-lower alkenyl groups have a phenyl group attached to a lower alkyl or lower alkenyl group of the type described above, respectively. Examples are benzyl, phenethyl, phenylpropyl, styryl, cinnamyl, etc.

The substituted phenyl-lower alkyl radicals include the same substituents as the substituted phenyl radicals, i.e., $R_7$-phenyl-lower alkyl, wherein $R_7$ is similarly lower alkyl (especially preferred), halo (preferably chloro or bromo) or lower alkoxy (preferably methoxy), particularly in the para-position. Especially preferred are the lower alkyl groups (both on the phenyl and joining the phenyl to the oxadiazole) having one to four carbons.

The heterocyclics represented by the group

are named above.

The compounds of formula I form acid addition salts with a variety of inorganic and organic acids. These salts include the hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with one or more equivalents of acid. They are preferably isolated and used in the form of a salt, the hydrochloride being the first choice.

The compounds of this invention are useful as anti-inflammatory agents and are effective in the prevention and inhibition of granuloma tissue formation in warm blooded animals, for example, in a manner similar to indomethacin. They may be used to decrease joint swelling tenderness, pain and stiffness, in mammalian species, e.g., in conditions such as rheumatoid arthritis. A compound of this invention or a physiologically acceptable acid addition salt of the character described above may be compounded according to accepted pharmaceutical practice in oral dosage forms such as tablets, capsules, elixirs or powders for administration of about 100 mg to 2 gm per day, preferably 100 mg to 1 gm per day, in two to four divided doses. For example, about 15 mg/kg/day is effective in reducing paw swelling in rats.

The new compounds of formula I are produced from 5-haloalkyl-1,2,4-oxadiazole derivatives of the formula (II) 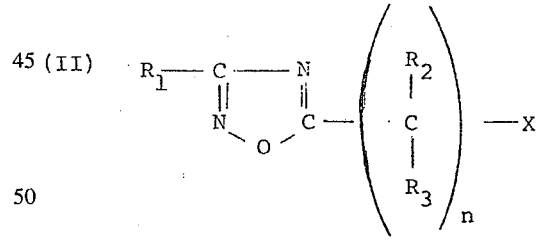

by reaction with a thiourea derivative of the formula (III) 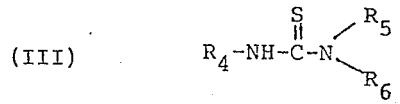

The symbols all have the meanings defined previously. X is a halogen, preferably chlorine or bromine.

This reaction is effected by dissolving or suspending the reactants in an inert organic solvent, e.g. an alcohol like ethanol. Heat may be applied if desired to hasten the dissolution. The reaction, in general, occurs on standing, usually at room temperature, although elevated temperatures, e.g. up to reflux temperature are sometimes called for. Stirring is optional. The product frequently crystallizes from the reaction mixture in the form of its acid addition salt, which may be readily isolated by conventional separation techniques. Recrystallization from an alcohol is useful to further purify the product.

The starting materials of formula II are compounds of a known class which are produced from amidoximes of the formula (IV) 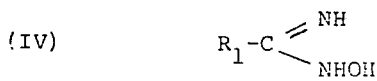

by reaction with an acid halide of the formula (V) 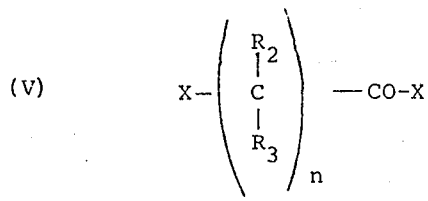

As a result of this reaction, an intermediate of the following formula forms (VI) 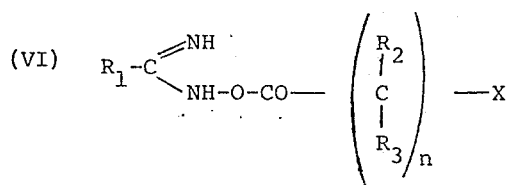

then water splits off and cyclization occurs yielding the material of formula II. See, for example, Fortschritte der chemischen Forschung 4 (No. 4), 810 (1965). Other members of the group are formed by the above illustrative procedure.

The following examples are illustrative of the invention. All temperatures are on the centigrade scale.

EXAMPLE 1

3-Methyl-5-(amidinomercaptomethyl)-1,2,4-oxadiazole, hydrochloride 7.6 g. of thiourea are brought into solution in 60 ml. of ethanol by warming. The solution is permitted to cool whereupon the thiourea separates in a finely divided form. To this suspension are added 13.3 g (0.1 mol) of 3-methyl-5-chloromethyl-1,2,4-oxadiazole and the mixture is stirred overnight. The thiourea gradually goes into solution. On the second day new crystals separate. 9.7 g of 3-methyl-5-(amidinomercaptomethyl)-1,2,4-oxadiazole, hydrochloride, m.p. 153°–154°, are obtained. By adding ether to the mother liquor an additional 8.3 g. of product, m.p. 149°–150°, are obtained.

EXAMPLE 2

3-Phenyl-5-(amidinomercaptomethyl)-1,2,4-oxadiazole, hydrochloride 40.4 g (0.2 mol) of 3-phenyl-5-chloromethyl-1,2,4-oxadiazole are added to a suspension of 15.2 g of finely divided thiourea in 300 ml. of ethanol and the mixture is allowed to stand at room temperature for 20 hours. 3-Phenyl-5-(amidinomercaptomethyl)-1,2,4-oxadiazole, hydrochloride, crystallizes, m.p. 171°–173°, yield 49.5 g.

EXAMPLE 3

3-Phenyl-5-(N,N,N'-trimethylamidinomercaptomethyl)-1,2,4-oxadiazole, hydrochloride 2.4 g. of N,N,N'-trimethylthiourea and 4.04 g. of 3-phenyl-5-chloromethyl-1,2,4-oxadiazole are dissolved in 50 ml. of methylene chloride and heated at 40° for three days. The precipitate is filtered under suction to obtain 4.3 g. of 3-phenyl-5-(N,N,N'-trimethylamidinomercaptomethyl)-1,2,4-oxadiazole, hydrochloride, m.p. 162°–164°.

EXAMPLE 4

3-Phenyl-5-(2-amidinomercaptoethyl)-1,2,4-oxadiazole, hydrochloride

A solution of 9.95 g. of 3-phenyl-5-(2-chloroethyl)-1,2,4-oxadiazole and 3.8 g. of thiourea are refluxed for three days. The raction mixture is concentrated in a rotary evaporator and the residue is triturated with ether. The ether insoluble portion is crystallized from isopropanol to obtain 6.5 g. of 3-phenyl-5-(2-amidinomercaptoethyl)-1,2,4-oxadiazole, hydrochloride, m.p. 160°–161°.

EXAMPLE 5

3-p-Chlorophenyl-5-(amidinomercaptomethyl)-1,2,4-oxadiazole, hydrochloride

By substituting 3-p-chlorophenyl-5-chloromethyl-1,2,4-oxadiazole as the starting material in the procedure of Example 2a, 3-p-chlorophenyl-5-(amidinomercaptomethyl)-1,2,4-oxadiazole, hydrochloride, is obtained, m.p. 195° (dec).

EXAMPLE 6

3-p-Methoxyphenyl-5-(amidinomercaptomethyl)-1,2,4-oxadiazole, hydrochloride

By substituting 3-p-methoxyphenyl-5-chloromethyl-1,2,4-oxadiazole as the starting material in the procedure of Example 2a, 3-p-methoxyphenyl-5-chloromethyl-1,2,4-oxadiazole, hydrochloride, is obtained, m.p. 182° (dec).

EXAMPLE 7 a.

DL-3-(α-Phenylpropyl)-5-chloromethyl-1,2,4-oxadiazole 100 g. of α-phenylbutyrylnitrile are added to a solution of 27.3 g. of hydroxylamine in 620 ml. of ethanol and the mixture is permitted to stand for two days at room temperature. This is then concentrated in the rotary evaporator. The residue is taken up in ether and the ether phase is extracted with 4×100 ml. of 2N hydrochloric acid. The hydrochloric acid extracts are combined and adjusted to pH 7–7.5 with 2N sodium hydroxide solution. The oil which separates is taken up in methylene chloride. The methylene chloride solution is dried with magnesium sulfate, filtered and 80 g. of pyridine are added. Then 95 g. of chloracetylchloride are added dropwise with stirring at a temperature of 0°–5°. The mixture is then stirred for three more hours at room temperature.

The solvent is evaporated, water is added to the residue and it is extracted with 3×200 ml. of toluene. The toluene extracts are washed with dilute hydrochloric acid and water, dried with magnesium sulfate and heated in a reflux condenser for 3 hours to remove water. The solvent is then evaporated and the residue is distilled under vacuum to obtain 46.3 g. of DL-3-($\alpha$-phenylpropyl)-5-chloromethyl-1,2,4-oxadiazole, b.p.$_{0.01}$ 109°–110°.

b.

DL-3-($\alpha$-phenylpropyl)-5-(amidinomercaptomethyl)-1,2,4-oxadiazole, hydrochloride By reacting 4.72 g. of DL-3-($\alpha$-phenylpropyl)-5-chloromethyl-1,2,4-oxadiazole and 1.52 g. of thiourea in 20 ml. of ethanol according to the procedure of Example 2a, 4.0 g. of DL-3-($\alpha$-phenylpropyl)-5-(amidinomercaptomethyl)-1,2,4-oxadiazole, hydrochloride, are obtained, m.p. 162°–164° (dec).

The following additional products are obtained by the procedure of Example 1 by substituting for either of the starting materials the 5-chloromethyl-1,2,4-oxadiazole having the substituents $R_1$, $R_2$ and $R_3$ indicated in the table or a thiourea having the substituents $R_4$, $R_5$ and $R_6$ indicated in the table, respectively.

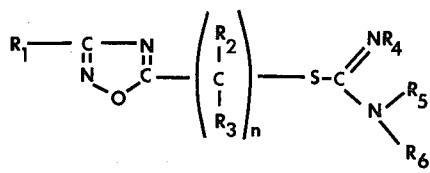

| Example | $R_1$ | $R_2$ | $R_3$ | $R_4$ | $N{<}^{R_5}_{R_6}$ | n |
|---|---|---|---|---|---|---|
| 8 | $C_2H_5$ | H | H | H | —$NH_2$ | 1 |
| 9 | i—$C_3H_7$ | $CH_3$ | H | H | —$NH_2$ | 1 |
| 10 | $C_6H_5$ | $CH_3$ | $CH_3$ | H | —$NH_2$ | 2 |
| 11 | $CH_3$—⟨phenyl⟩ | $C_2H_5$ | H | H | —N($CH_3$)$_2$ | 1 |
| 12 | $CH_3$ | $CH_3$ | $CH_3$ | H | —$NH_2$ | 3 |
| 13 | ⟨S⟩— | H | H | H | —$NH_2$ | 2 |
| 14 | ⟨S⟩— | $CH_3$ | H | $CH_3$ | —N($CH_3$)$_2$ | 1 |
| 15 | $CH_3$ | $CH_3$ | H | H | —$NH_2$ | 3 |
| 16 | $CH_3CH{=}CH$— | H | H | H | —$NHCH_3$ | 1 |
| 17 | ⟨phenyl⟩—CH=CH— | H | H | H | —$NH_2$ | 1 |
| 18 | ⟨phenyl⟩—$CH_2$—CH=CH— | H | H | $C_2H_5$ | —$NH_2$ | 1 |
| 19 | $CH_3$O—⟨phenyl⟩— | H | H | $C_2H_5$ | —$NH_2$ | 1 |
| 20 | ⟨phenyl⟩—$CH_2$— | $C_2H_5$ | H | H | —$NH_2$ | 2 |
| 21 | $CH_3$ | H | H | $CH_3$ | —N⟨piperidinyl⟩ | 1 |
| 22 | $C_2H_5$ | H | H | H | —N⟨pyrrolidinyl⟩ | 2 |
| 23 | ⟨phenyl⟩— | H | H | H | —N⟨morpholinyl⟩ | 1 |
| 24 | $CH_3$—⟨phenyl⟩—CH($CH_3$)— | H | H | H | —N⟨thiomorpholinyl⟩ | 1 |
| 25 | ⟨phenyl⟩—CH(CH($CH_3$)$_2$)— | H | H | H | N⟨piperazinyl⟩NH | 1 |

| Example | R₁ | R₂ | R₃ | R₄ | N(R₅)(R₆) | n |
|---|---|---|---|---|---|---|
| 26 | C₂H₅ | H | H | C₂H₅ | —N(C₂H₅)₂ | 1 |
| 27 | (CH₃)₂CH—CH₂—C₆H₄— | H | H | H | —N(CH₃)₂ | 1 |
| 28 | C₆H₅—CH(C₂H₅)— | H | H | CH₃ | piperidino | 1 |
| 29 | Cl—C₆H₄—CH(CH₃)— | H | H | H | azetidino | 2 |

What is claimed is:

1. A compound of the formula

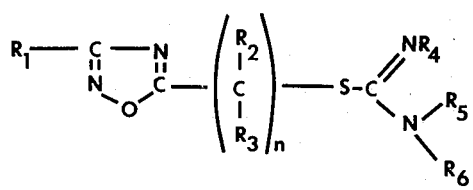

wherein $R_1$ is lower alkyl, phenyl, p-chlorophenyl, p-methoxyphenyl or phenyl-lower alkyl, $R_2$, $R_3$, $R_4$, $R_5$ and $R_6$ each is hydrogen or lower alkyl, and $n$ is 1 or 2, said lower alkyl groups having less than four carbon atoms.

2. A compound as in claim 1 wherein each lower alkyl group is methyl.

3. A compound as in claim 1 wherein $R_1$ is methyl, $R_2$, $R_3$, $R_4$, $R_5$ and $R_6$ each is hydrogen and $n$ is 1.

4. A compound as in claim 1 wherein $R_1$ is phenyl, $R_2$, $R_3$, $R_4$, $R_5$ and $R_6$ each is hydrogen and $n$ is 1.

5. A compound as in claim 1 wherein $R_1$ is phenyl, $R_2$ and $R_3$ each is hydrogen, $R_4$, $R_5$ and $R_6$ each is methyl and $n$ is 1.

6. A compound as in claim 1 wherein $R_1$ is phenyl, $R_2$, $R_3$, $R_4$, $R_5$ and $R_6$ each is hydrogen and $n$ is 2.

7. A compound as in claim 1 wherein $R_1$ is p-chlorophenyl, $R_2$, $R_3$, $R_4$, $R_5$ and $R_6$ each is hydrogen and $n$ is 1.

8. A compound as in claim 1 wherein $R_1$ is p-methoxyphenyl, $R_2$, $R_3$, $R_4$, $R_5$ and $R_6$ each is hydrogen and $n$ is 1.

9. A compound as in claim 1 wherein R is α-phenylpropyl, $R_2$, $R_3$, $R_4$, $R_5$ and $R_6$ each is hydrogen and $n$ is 1.

* * * * *